United States Patent [19]
Norling et al.

[11] Patent Number: 5,165,279
[45] Date of Patent: Nov. 24, 1992

[54] MONOLITHIC ACCELEROMETER WITH FLEXURALLY MOUNTED FORCE TRANSDUCER

[75] Inventors: Brian L. Norling, Mill Creek; Rex B. Peters, Woodinville, both of Wash.

[73] Assignee: Sundstrand Corporation, Rockford, Ill.

[21] Appl. No.: 544,221

[22] Filed: Jul. 6, 1989

[51] Int. Cl.⁵ .............................................. G01P 15/10
[52] U.S. Cl. ............................ 73/517 AV; 73/DIG. 1
[58] Field of Search ......... 73/517 AV, 516 R, 517 R, 73/DIG. 1, DIG. 4

[56] References Cited

U.S. PATENT DOCUMENTS

| | | | |
|---|---|---|---|
| 4,215,570 | 8/1980 | Eer Nisse | 73/DIG. 4 |
| 4,299,122 | 11/1981 | Ueda et al. | 73/DIG. 1 |
| 4,372,173 | 2/1983 | Eer Nisse et al. | 73/862.59 |
| 4,751,849 | 6/1988 | Paros et al. | 73/862.59 |
| 4,766,768 | 8/1988 | Norling et al. | 73/497 |
| 4,881,408 | 11/1989 | Hulsing et al. | 73/517 AV |
| 4,939,935 | 7/1990 | Amand | 73/517 AV |

FOREIGN PATENT DOCUMENTS 2121953 1/1984 United Kingdom.
2162314 1/1986 United Kingdom.

Primary Examiner—John E. Chapman
Attorney, Agent, or Firm—Mason, Kolehmainen, Rathburn & Wyss

[57] ABSTRACT

An accelerometer comprising a monolithic crystalline substrate, the substrate comprising a support, a proof mass, and a force transducer. The proof mass is connected to the support by one or more proof mass flexures that permit the proof mass to rotate with respect to the support about a hinge axis. One end of the force transducer is connected to the support, and the other end is connected to the proof mass by a transducer flexure. The transducer flexure has a thickness substantially less than the thickness of the transducer, such that when the proof mass rotates, the transducer rotates with respect to the proof mass about a transducer axis that passes through the transducer flexure. Preferably, the transducer axis is offset from the hinge axis in a manner so as to cancel nonlinearities in the force transducer, and the length of the proof mass along the pendulous axis is less than half the length of the transducer. Damping plates are positioned above and below the proof mass, and provide shock stops and damping.

9 Claims, 3 Drawing Sheets

MONOLITHIC ACCELEROMETER WITH FLEXURALLY MOUNTED FORCE TRANSDUCER

FIELD OF THE INVENTION

The present invention relates to accelerometers and, in particular, to accelerometers in which a proof mass and force transducer are fabricated, in monolithic form, from a crystalline substrate.

BACKGROUND OF THE INVENTION

The design of high-precision accelerometers presents a number of common problems and goals. First, the accelerometer design should be based upon easily manufacturable parts that can be batch processed for low cost. Second, the accelerometer should be designed for high stability. This can be achieved by selecting highly stable parent materials for the accelerometer components, and by eliminating assembly joints in the sensor wherever possible. Third, the accelerometer should be sensitive to acceleration along a single axis, and insensitive to all other forms and directions of acceleration. Finally, the design should provide damping and shock caging within a simple assembly that does not require manual adjustment.

Many of the goals described above can be achieved by fabricating the accelerometer such that many of the key components, including the proof mass, flexures, and force transducers, are chemically machined using photolithography from a monolithic crystalline substrate. Unfortunately, in the past, while such accelerometers have been low in cost, they have also been relatively low-precision devices. One prior monolithic accelerometer is illustrated in U.K. Patent Application No. 2,162,314. The transducer described therein includes a U-shaped proof mass connected to a support by a pair of flexures, and a dual vibrating beam force transducer connected between the proof mass and the support. This structure is fabricated from a single crystal of silicon. Various means are described for causing the beams to oscillate, and for detecting the frequency of oscillation of the beams.

The accelerometer structure described in U.K. Patent Application No. 2,162,314 has a number of problems that limit its practical utility. For example, the proposed structure does not provide effective means for damping and shock caging of the proof mass. In addition, no techniques are disclosed for overcoming the relatively high inherent nonlinearity of the proposed structure. Finally, since the device is fabricated from silicon, comparatively complex means are required for causing and sensing beam vibration.

SUMMARY OF THE INVENTION

The present invention provides a monolithic accelerometer that is capable of high performance as well as low cost. The accelerometer comprises a monolithic crystalline substrate, the substrate comprising a support, a proof mass, and a force transducer. The proof mass is connected to the support by one or more proof mass flexures. The proof mass flexures permit the proof mass to rotate with respect to the support about a hinge axis, in response to acceleration directed along a sensitive axis normal to the hinge axis. The force transducer has a longitudinal force sensing axis that is parallel to a pendulous axis, the pendulous axis being normal to the hinge axis and to the sensitive axis. One end of the force transducer is connected to the support. The other end of the force transducer is connected to the proof mass by a transducer flexure.

The transducer flexure has a thickness substantially less than the thickness of the transducer. Therefore when the proof mass rotates with respect to the support, the transducer rotates with respect to the proof mass about a transducer axis that passes through the transducer flexure. Preferably, the transducer axis is offset from the hinge axis, in a direction along the pendulous axis. In an embodiment in which the force transducer is a dual vibrating beam force transducer, the offset may be selected so as to reduce the nonlinearity inherent in the force-to-frequency characteristic of such a transducer. Preferably, the offset is selected so as to substantially cancel such nonlinearity at full scale input, a choice that has the important effect of minimizing vibration rectification error.

In another preferred aspect of the invention, the length of the proof mass along the pendulous axis is less than half the length of the force transducer. Damping plates are positioned above and below the proof mass, and limit movement of the proof mass, and also serve to damp proof mass motion.

DETAILED DESCRIPTION OF THE INVENTION

Figure 1:
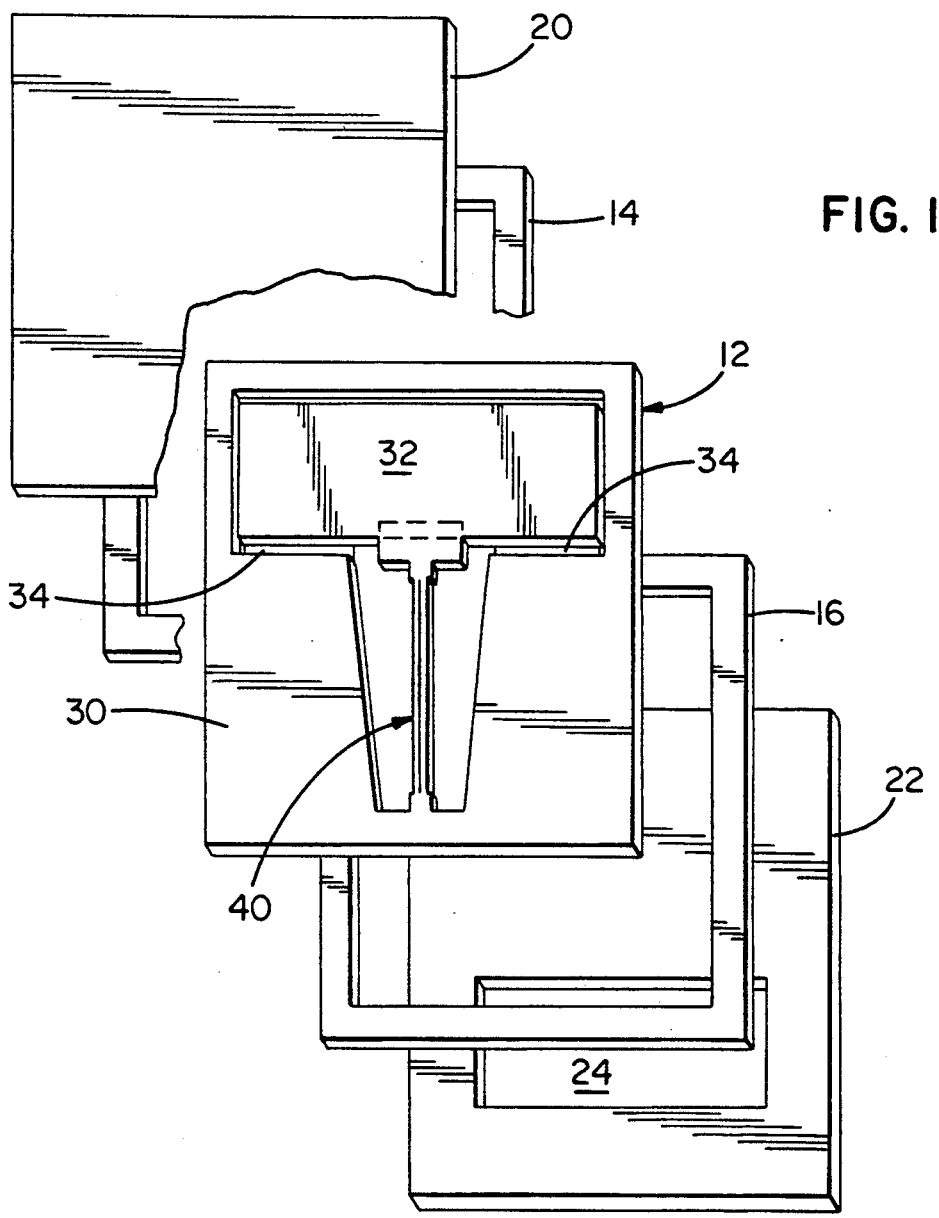
FIG. 1 is an exploded view of an accelerometer according to the present invention.

A preferred embodiment of the accelerometer of the present invention is illustrated in FIGS. 1 through 4B. Referring initially to FIG. 1, the accelerometer comprises sensing mechanism 12 that is sandwiched between a pair of spacers 14 and 16 that are in turn held between damping plates 20 and 22. Opening 24 in damping plate 22 permits electrical connection between the sensing mechanism and external circuitry. The assembled structure is shown in cross section in FIG. 2. The spacers may be provided as separate pieces, as shown, or they may be formed by etching setback regions in the sensing mechanism or the damping plates.

Figure 2:
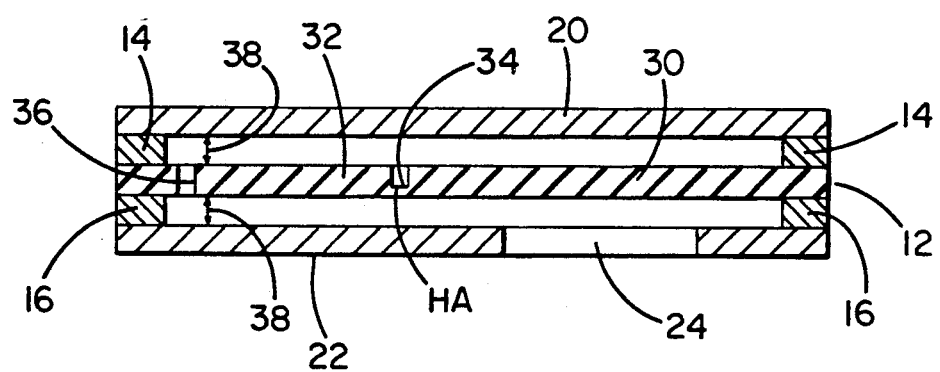
FIG. 2 is a cross-sectional view of the assembled accelerometer.
Figure 3:
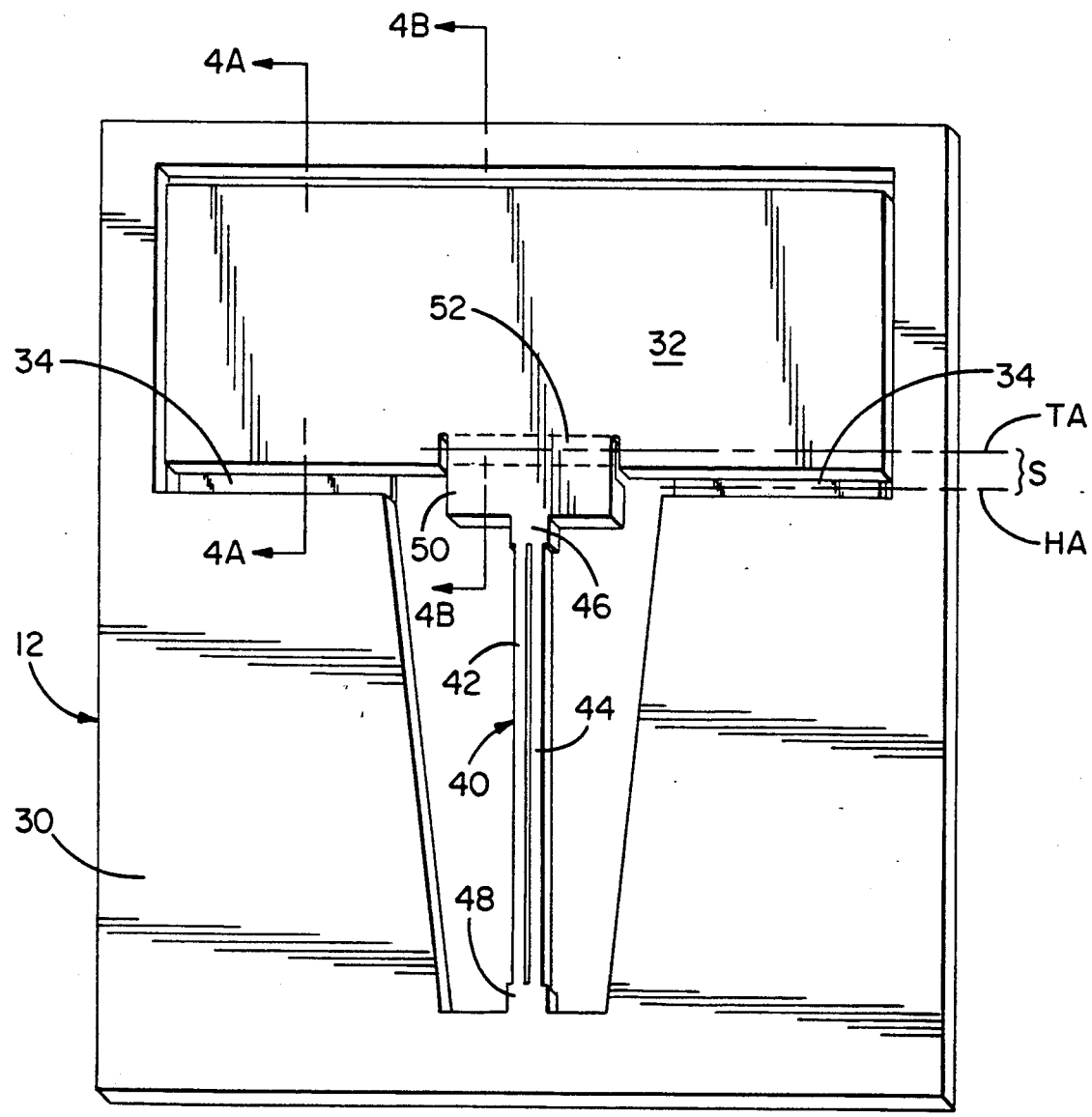
FIG. 3 is a perspective view of the sensing mechanism.
Figure 4A:
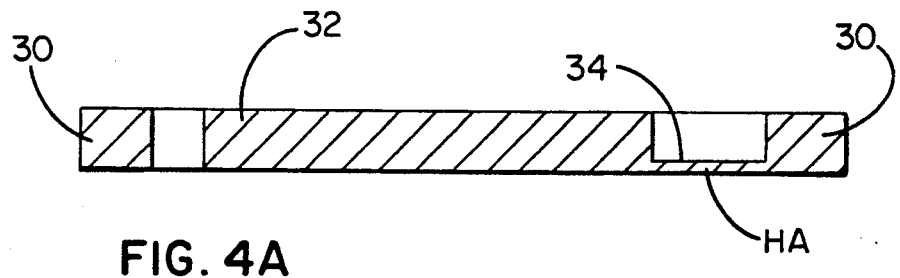
FIG. 4A is a cross-sectional view taken along the line 4A—4A of FIG. 3.
Figure 4B:
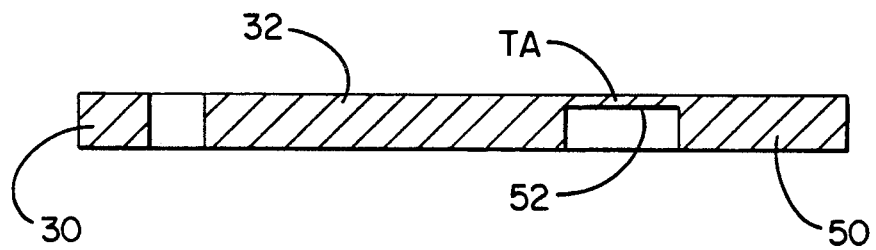
FIG. 4B is a cross-sectional view taken along the line 4B—4B of FIG. 3.

Sensing mechanism 12 includes support 30 from which proof mass 32 is suspended by two proof mass flexures 34, such that the proof mass can rotate with respect to the support about hinge axis HA that passes through both of flexures 34. The cross section of FIG. 2 is taken through one of proof mass flexures 34. The spacing between the outermost end 36 of proof mass 32 and damping plates 20 and 22 defines a pair of gaps 38 that limit the rotational deflection of the proof mass about hinge axis HA.

Dual vibrating beam force transducer 40 is also connected between support 30 and proof mass 32. Force transducer 40 includes beams 42 and 44 that extend between interconnecting end portions 46 and 48. End portion 46 is connected to and extends from connecting member 50, and the connecting member is joined to proof mass 32 by transducer flexure 52. At the other end of the transducer, end portion 48 is joined directly to support 30. Alternately, a second transducer flexure could be used to join end portion 48 to the support. The function of connecting member 50 is to make transducer flexure 52 as wide as practical, to minimize flexure stress.

The entire sensing mechanism 12 is a monolithic structure fabricated by etching or chemically milling a wafer of crystalline material, preferably crystalline quartz. Because crystalline quartz is piezoelectric, the use of crystalline quartz permits a relatively straightforward implementation of force transducer 40. In particular, force transducer 40 may be constructed in the manner set forth in U.S. Pat. Nos. 4,215,570 and 4,372,173, wherein electrodes are positioned on the surfaces of the beams, and coupled to a suitable drive circuit for causing the beams to oscillate at their resonant frequency. Acceleration in a direction normal to the sensing mechanism causes proof mass 32 to rotate about hinge axis HA, thereby placing a tension or compression force on force transducer 40. The force causes the resonant frequency to change, and measurement of such frequency via the drive circuit thereby provides a measure of the acceleration.

The thicknesses of support 30, proof mass 32 and force transducer 40 are preferably identical to one another. This is readily achieved by fabricating the sensing mechanism from a single wafer of uniform thickness. In contrast, proof mass flexures 34 are substantially thinner than the support or proof mass, and are formed so that they are contiguous with the lower surface of the sensing mechanism, as viewed in FIGS. 1–4A. Similarly, transducer flexure 52 is substantially thinner than the proof mass or force transducer, and is contiguous with the upper surface of the sensor mechanism. Transducer flexure 52 permits relative rotation of the force transducer with respect to the proof mass about a transducer axis TA that passes through the transducer flexure. In accordance with an important feature of the present invention, hinge axis HA and transducer axis TA are preferably offset from one another, as measured along a direction parallel to transducer 40, by an offset distance S. The significance of offset S is described below.

A significant advantage of the present invention is that it permits the geometry of sensing mechanism 12 to be adjusted so as to significantly reduce the nonlinearities inherent in force-to-frequency transducers, and also permits the implementation of an effective technique for damping proof mass motion. A conceptual view of the sensing mechanism geometry is set forth in FIG. 5. As illustrated, proof mass 32 is suspended for rotation about hinge axis HA, and has a center of mass 60. A line passing through hinge axis HA and center of mass 60, and normal to the hinge axis, defines a pendulous axis PA. The sensitive axis SA along which the accelerometer is sensitive to input accelerations is normal to the hinge axis and to the pendulous axis. Center of mass 60 is located half way between the upper and lower surface of proof mass 32. However in the embodiment illustrated in FIGS. 1–4, hinge axis HA is located closer to the lower surface than to the upper surface of the proof mass.

Force transducer 40 is connected between a first mounting point 62 on the support, and a second mounting point on proof mass 32 at transducer axis TA. The thickness of proof mass 32 is t, and a/2 is the distance between hinge axis HA and center of mass 60, measured along pendulous axis PA. Force transducer 40 has a longitudinal force sensing axis that is approximately parallel to pendulous axis PA. S is the distance between hinge axis HA and transducer axis TA, measured along the pendulous axis, while L is the total length of the force transducer. Parameter r is the perpendicular distance between force transducer 40 and hinge axis HA.

Figure 5:
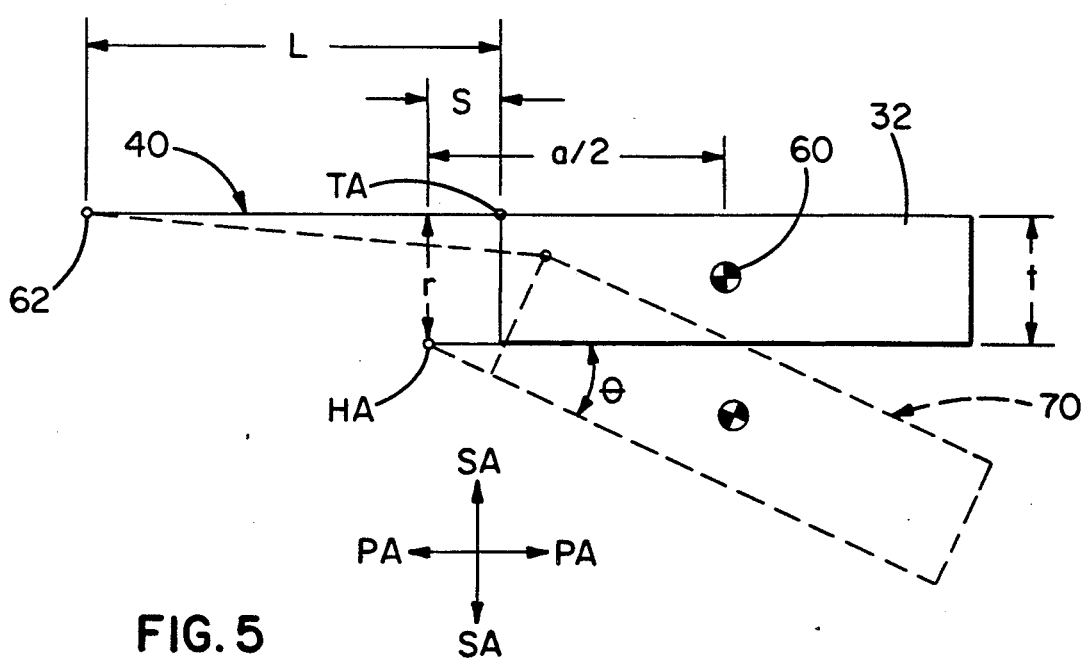
FIG. 5 is a conceptual view, illustrating the geometrical features of the sensing assembly.

Assume that in response to an acceleration, proof mass 32 rotates about hinge axis HA, to position 70 shown in phantom in FIG. 5. If the force exerted along force transducer 40 is represented by F and the acceleration-induced force acting at center of mass 60 is P, then for small angular deflections:

$$Fr = \frac{a}{2} P \tag{1}$$

$$r = t - S\theta\left(\frac{L-S}{L}\right) = t\left[1 - \frac{s}{t}\theta\left(\frac{L-S}{L}\right)\right] \tag{2}$$

The effect of the rotation is to reduce r, so that F must be increased for a given acceleration force P. It can be shown that this effect introduces a square law increase in F with increasing P, i.e.:

$$F = \frac{Pa}{2t}\left[1 + C\frac{Pa}{2t}\right] \tag{3}$$

where C is a constant. Many force-to-frequency transducers have an inherent square law relationship between force and frequency that may be modeled by the following equation:

$$f = f_0 + k_1 F(1 - k_2 F) \tag{4}$$

where f is the vibration frequency, $f_0$ is the zero-acceleration vibration frequency, $k_1$ is the scale factor, and $k_2$ is the square law coefficient. Examples include single and dual vibrating beam transducers and surface acoustic wave transducers. The increase in F with increasing $P^2$, as per Equation (3), can be used to offset the reduction in frequency due to the $k_2$ term in Equation (4). Assume that N represents the relative contribution of the term $k_2$ to output frequency f at full scale input. By way of example, for a dual vibrating beam force transducer whose frequency deviates ±10% at full scale input, parameter N is about 5.5%, or 0.055. To compensate for this nonlinearity N, the value of r at full scale input must decrease by the same amount N. Thus from Equation (2), one obtains:

$$\frac{s}{t}\theta_{max}\left(\frac{L-S}{L}\right) = N \tag{5}$$

where $\theta_{max}$ is approximately equal to $\delta_{max}/t$, $\delta_{max}$ being the scale elongation of force transducer 40 at full scale input. Making this substitution in Equation (5), one obtains:

$$S\left(\frac{L-S}{L}\right) \cdot \frac{\delta_{max}}{t^2} = N \tag{6}$$

Equation (6) may be used directly to obtain a suitable value for S, such that the transducer nonlinearity is reduced or cancelled. If S is substantially less than L, then Equation (6) simplifies to $$S = \frac{Nt^2}{\delta_{max}} \quad (7)$$

By way of example, if t is equal to 0.0031 inches, and $\delta_{max}$ is equal to 66 microinches, then for N=0.055, a suitable value for S would be 0.008 inches. Because of the large lever ratio inherent in the design, only this small offset is required to compensate for 5.5% nonlinearity in the transducer characteristic. As indicated above, a value of 5.5% for N is appropriate for a dual vibrating beam transducer whose frequency deviates ±10% at full scale input. For reasons discussed in U.S. Pat. No. 4,372,173, ±10% frequency deviation represents a practical upper limit for transducers of this type. Different values of N may be appropriate for different types of transducers, or for dual vibrating beam transducers that are operated at a maximum frequency range of less than ±10%. Selecting the correct value for S improves linearity by cancelling the dominant second order nonlinearity of the vibrating beam force transducer. In so doing, it greatly improves linearity at high g levels, and also substantially cancels the vibration rectification errors at lower g levels.

The parameter $\theta_{max}$, the angular deflection of the proof mass at full scale input, is defined by the proof mass thickness t and by $\delta_{max}$. The minimum size h for gaps 38 (FIG. 2) is equal to $a\theta_{max}$, where a is the total length of the proof mass along the pendulous axis. However a preferred value for h is given by $$h = 1.5a\theta_{max} \quad (8)$$

to provide some margin before the proof mass bottoms out. This relationship imposes an upper limit on the proof mass length a. In addition, the parameters a and t define the pendulum width b, while parameters a, b and h define the degree of damping that will be obtained. In practical designs, the damping must be sufficient to prevent a Q value greater than about 10 at resonance. When these constraints are applied to a crystalline quartz accelerometer of the type described, it has been discovered that the length a of the proof mass along pendulous axis PA must be no greater than half the length of force transducer 40. In a particular embodiment of the accelerometer that meets the above-noted constraints, the proof mass length, width and thickness are 0.1, 0.25 and 0.0031 inches respectively, full scale is 1000 g, the value of Q is about 10, and gaps 36 are equal to 0.0031 inches, to provide shock stops at 1500 g.

It will be noted that the upper and lower surfaces of proof mass 32 are continuous. The term "continuous" refers to the fact that any straight line path from one edge of the proof mass surface to another will lie entirely within such surface. The advantage of having continuous or substantially continuous proof mass surfaces is that the damping that can be obtained from a given surface area is increased, in comparison to noncontinuous surfaces such as that shown in U.K. Patent Application 2,162,314.

While the preferred embodiments of the invention have been illustrated and described, variations will be apparent to those skilled in the art. For example, the invention may be implemented using force transducers other than those specifically described, including AC coupled piezoelectric transducers, surface acoustic wave transducers, and strain gauges. Accordingly, the scope of the invention is to be determined by reference to the following claims.

The embodiments of the invention in which an exclusive property or privilege is claimed are defined as follows:

1. An accelerometer for measuring acceleration up to a predetermined full-scale input acceleration, the accelerometer comprising a monolithic crystalline substrate, the substrate comprising:

a support;
   a proof mass;
   at least one proof mass flexure connecting the proof mass to the support such that the proof mass can rotate with respect to the support about a hinge axis in response to acceleration directed along a sensitive axis normal to the hinge axis;
   a force transducer having a longitudinal force sensing axis that is parallel to a pendulous axis, the pendulous axis being normal to the hinge axis and to the sensitive axis, the force transducer being characterized by a predetermined relationship between applied force and output frequency, said relationship including a second order nonlinearity; and
   a transducer flexure connecting the second end of the transducer to the proof mass, the transducer flexure having a thickness substantially less than the thickness of the transducer such that when the proof mass rotates with respect to the support, the transducer rotates with respect to the proof mass about a transducer axis that passes through the transducer flexure, the transducer axis being offset from the hinge axis in a direction along the pendulous axis, said offset being selected so as to reduce said nonlinearity between applied force and frequency.

2. The accelerometer of claim 1, wherein said offset is selected so as to substantially cancel said nonlinearity.

3. The accelerometer of claim 1, wherein the support, proof mass and force transducer all have a common thickness along the sensitive axis, and all lie in a common plane.

4. The accelerometer of claim 1, wherein the force transducer is a dual vibrating beam force transducer.

5. The accelerometer of claim 4, wherein said offset is selected so as to substantially cancel said nonlinearity.

6. The accelerometer of claim 4, wherein the force transducer comprises first and second beams extending between first and second end sections, and a connecting member between one of the end sections and the transducer flexure, the transducer, proof mass and connecting member all having a common thickness along the sensitive axis, and all lying in the same plane.

7. The accelerometer of claim 1, further comprising first and second damping plates positioned above and below the substrate, the damping plates being spaced from the proof mass by gaps, the gaps being sized such that the damping plates function to limit travel of the proof mass in response to over range inputs.

8. The accelerometer of claim 7, wherein the gaps serve to damp vibration of the proof mass, such that the proof mass has a Q no larger than about 10 at resonance.

9. The accelerometer of claim 1, wherein the length of the proof mass along the direction parallel to the pendulous axis is less than half the length of the force transducer along the same direction.

* * * * *